Aug. 21, 1962 G. FISCHER 3,050,016
SET OF WHEELS FOR VEHICLES RUNNING ON TWO RAILS
Filed July 6, 1960
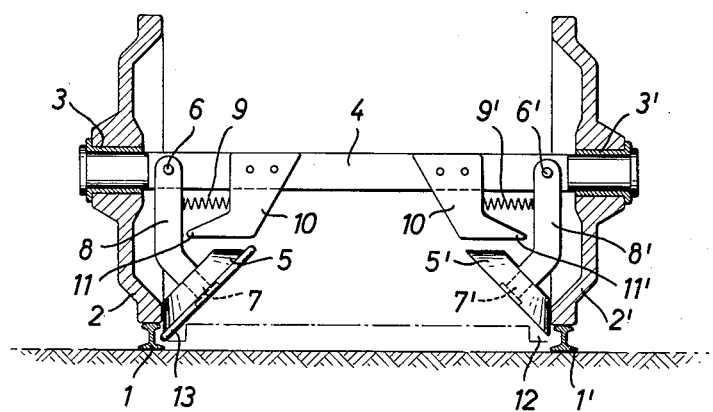

United States Patent Office 3,050,016
Patented Aug. 21, 1962

3,050,016
SET OF WHEELS FOR VEHICLES RUNNING ON TWO RAILS
Günter Fischer, Gauss Strasse 15, Braunschweig, Germany
Filed July 6, 1960, Ser. No. 41,205
Claims priority, application Germany July 8, 1959
5 Claims. (Cl. 104—245)

This invention relates to a set of wheels for a vehicle running on two rails, the said set of wheels comprising a stationary axle and two flangeless wheels supported for rotation about said axle.

As a rule, rail vehicles are guided along the rails by means of flanges provided on the wheels of the vehicle. Hitherto it has been impossible to increase the speed of travel of such vehicles above certain limits, because the said flanges do not afford sufficient safety against the derailment of the vehicles at such elevated speeds. It has already been proposed to omit the said flanges and to provide, for the purpose of guiding a vehicle along the rails, separate guide rollers which cooperate either with the inner edge or with the outer edge of the head of each rail or with additional guide rails disposed either between the rails forming the track or outside thereof. However, all of these known arrangements suffer from the drawback that they occupy additional space and thus require the use of differently constructed roadbeds and rail tracks. Moreover, the use of additional guide rails disposed between the rails of the track renders it impossible to use vehicles of conventional construction on the same track; in other words, it is impossible to use existing tracks.

According to the present invention, the aforementioned drawbacks are eliminated by the provision of a set of wheels of the aforesaid nature which comprises one tapered guide roller in association with each wheel, the said tapered guide rollers being in constant engagement with the adjacent lateral faces of the vehicle wheels and/or the adjacent lateral surfaces of the rail head. These guide rollers of the invention afford the advantage that they require no additional space outside the outline of the vehicle and that they reduce to a sufficient extent the hazard of the vehicle being derailed at high speeds of travel. In view of the tapered configuration of the guide rollers, the outline of the vehicle between the rails laterally of the rail heads has to be displaced outwardly to a small extent only. Furthermore, it is possible to use existing switches in the tracks over which a vehicle according to the invention travels, it being only necessary to modify the frogs and slightly to increase the travel of the switch blades.

According to another aspect of the invention, each guide roller is supported for rotation on a pivotally mounted lever which is influenced by energy storing means. The range of angular movement of the said lever is conveniently limited by a fixed abutment, this arrangement taking into consideration the fact that it is impossible to keep the gauge of the track in agreement with the desired dimension within a small fraction of an inch. Thus, it is possible, according to the invention, to provide for a greater amount of lateral play in the means guiding the set of wheels.

In a particularly advantageous embodiment of the invention the guide rollers are provided with braking means, it being possible without difficulty to provide, in addition to such conventional braking means as rail or block brakes, a hydraulic turbine type brake, i.e. to connect the rotary guide roller with a turbine which is adapted to be braked by hydraulic means. Similarly it is possible to retard the guide roller by means of an electric device capable of being short-circuited.

Other objects and features of the invention will become apparent as the description proceeds, especially when taken in conjunction with the accompanying drawing illustrating a preferred embodiment of the invention.

In the single FIGURE of the drawing, it will be seen that the two rails 1, 1' support the vehicle wheels 2, 2' which are supported for rotation by the journal bearings 3, 3' provided on the axle 4 which is fixedly secured to the frame (not shown) of the vehicle. The rails 1, 1' also serve as guide rails. The two guide rollers 5, 5' are of tapered configuration and, depending on the position of the vehicle in relation to the track, respectively cooperate either with the adjacent inner faces of the wheels 2, 2' or with the adjacent inner surfaces of the rail heads as will be understood from an inspection of the drawing. The two guide rollers 5, 5' are of tapered configuration and are supported for rotation by means of bearings 7, 7' on their respective levers 8, 8' which are in turn pivotally mounted at 6 and 6', respectively. Strong springs 9, 9' of suitable stiffness urge the guide rollers 5, 5' against the vehicle wheels or the rails. Each of the springs 9, 9' is disposed between one of the levers 8, 8' and one of the abutments 10. The range of travel of the springs is limited by fixed projections of the abutments 10, which projections are denoted 11 and 11', so that the vehicle wheels 2, 2' cannot leave the rails 1, 1'. As will be seen in the drawing, the outline 12 between the rails requires only a slight displacement in an outward direction laterally of the rail heads, since the guide rollers are of tapered configuration.

The fixed projections 11, 11' also serve the function of limiting the lateral play of the vehicle wheel guide means in relation to the rail track. Since it is impossible to have the gauge of the track agree with the desired dimension within a small fraction of an inch, it is necessary to allow for a major amount of lateral play between the vehicle wheel guide means and the rails. With the set of wheels running in accurate alignment with the center line of the track, the guide rollers on either side will cooperate with the adjacent inner faces of the vehicle wheels. Should the set of wheels be displaced in an axial direction, which will occur, for example, when the vehicle is negotiating a curve, one guide roller will come in contact with the adjacent inner surface of the respective rail head, the said guide roller thus being moved away from the inner face of the wheel. Thus, the rotary speed of the guide roller will remain virtually unchanged. In contrast to guide rollers which will only rotate when they are brought into contact with a guide rail, the guide rollers of the invention are arranged to reduce both the rate of wear and the noise produced during operation to a minimum.

If the higher speeds of travel contemplated for standard gauge wheel sets are ultimately adopted, the conventional braking means such as disc or block brakes will no longer be sufficient. The invention now affords the possibility of additionally providing a hydraulic turbine type brake, i.e., of connecting with the rotary guide roller a turbine which is adapted to be retarded by hydraulic means. Similarly, the guide roller may be arranged to drive an electric device which may be short-circuited to retard the rotation of the guide roller.

In the case of model railways, the guide rollers should be provided with additional flanges 13 extending below the rail heads so as to prevent the vehicles from being tilted while rounding curves; such a flange 13 will be seen in the left-hand part of the drawing.

It is, of course, also possible, in contrast to the embodiment just described, to arrange the guide rollers externally so that they will cooperate with the adjacent outer surfaces of the rail heads. Furthermore it is possible to provide guide rollers on either side of both rails, the respective arrangement, whether internally and/or externally, being merely a matter of choice and economic considerations.

What is claimed is:

1. A set of wheels for vehicles travelling on a pair of rails comprising a non-rotative axle, two vehicle wheels rotatably mounted on the axle and having non-flanged peripheries adapted to roll on spaced apart rails, a frustro-conical guide roller for each of said wheels, each guide roller being disposed in angular relation to an adjoining side of its associated wheel and to the rail, the axes of said wheels and the axes of said guide rollers being angularly disposed but lying in the same vertical plane, lever means pivotally connected to the axle and depending therefrom and rotatably supporting said guide rollers and energy storing means pressing said guide rollers into running contact with the adjoining sides of the wheels when the wheels are in proper position on the rails and pressing the guide rollers so that one of them comes into running contact with the adjacent rail for a transient time when the wheels move too far laterally on the rails in a direction transversely of the rails.

2. A set of wheels as claimed in claim 1, wherein abutment means is provided and depends from the axle to limit the range of angular movement of said lever means in a direction away from the wheels.

3. A set of wheels as claimed in claim 2, said energy storing means including compression springs disposed between said lever means and said abutment means.

4. A set of wheels as claimed in claim 1, wherein said lever means includes a lever having an offset lower end provided with a bearing extension on which the guide roller is rotatably mounted.

5. A set of wheels as claimed in claim 1, wherein said guide rollers are provided with a flange adapted to extend beneath the heads of said rails.

References Cited in the file of this patent

UNITED STATES PATENTS 2,800,861     Michalski _____ July 30, 1957

FOREIGN PATENTS 698,481     France _____ Jan. 20, 1930